United States Patent [19]
Anderson

[11] 4,036,329
[45] July 19, 1977

[54] DISC BRAKE WITH ROTARY CAM ACTUATED RECIPROCATING PISTONS

[75] Inventor: Bruce D. Anderson, Berkley, Mich.

[73] Assignee: Rockwell International Corporation, Pittsburgh, Pa.

[21] Appl. No.: 631,097

[22] Filed: Nov. 12, 1975

[51] Int. Cl.² .............................................. F16D 55/08
[52] U.S. Cl. ................................... 188/72.7; 188/72.9
[58] Field of Search .................... 188/72.6, 72.7, 72.8, 188/72.4, 73.3, 72.9; 192/93, 70.24

[56] References Cited

U.S. PATENT DOCUMENTS

| 3,213,969 | 10/1965 | Rosanowski et al. | 188/72.6 X |
| 3,608,678 | 9/1971 | Kobayashi | 188/72.6 |
| 3,830,343 | 8/1974 | Gardner | 188/72.7 X |
| 3,850,268 | 11/1974 | Guettier | 188/72.7 X |

Primary Examiner—Trygve M. Blix
Assistant Examiner—Douglas C. Butler

[57] ABSTRACT

A disc brake including a pair of cams which contact a pair of cam followers rotatably mounted to pistons slidably carried in apertures provided to one leg of a floating caliper. The cams are secured to a shaft rotatably carried by the caliper. The cams are rotated by the shaft to move the rotary cam followers and pistons in the apertures. The pistons move one brake pad into friction contact with one side of a brake disc. A second brake pad carried by the other leg of the caliper is moved into friction contact with the other side of the disc by the reaction force through the cam shaft and caliper.

5 Claims, 5 Drawing Figures

DISC BRAKE WITH ROTARY CAM ACTUATED RECIPROCATING PISTONS

BACKGROUND OF THE INVENTION

The present invention relates to a disc brake and more specifically to an actuator for a disc brake for automotive vehicles.

The actuator of the present invention is particularly applicable to a disc brake of the floating caliper type wherin friction lining pads in the form of ring sections are carried by the caliper on opposite sides of a rotatable disc and are axially movable into contact with friction braking surfaces provided to a disc mounted for rotation with a vehicle wheel. In that type of brake, the pads are moved by an actuating mechanism or actuator which in turn is driven by a fluid motor. Brake systems powered by pneumatic pressure have been readily accepted for commercial vehicles since the required brake actuating force can be rapidly developed adjacent each wheel or wheel set using relatively compact air motors.

Since the total force available for application to the friction braking surface is dependent on the force required to operate the actuating mechanism, it is desirable to utilize an efficient actuating mechanism. This is particularly true in disc-type brake systems where the pressure required between the friction pads and the rotor is greater than the pressure required between the friction braking surfaces in drum-type brake systems.

Moreover, since the interfacing friction lining and rotor braking surfaces are substantially planar, parallel surfaces, it is also desirable to move the friction lining pads in a direction normal to the rotor braking surfaces and to bring the entire friction lining surface of each pad into contact with the rotor braking surface at one time under substantially uniform pressure to prevent uneven wear of the linings.

SUMMARY OF THE INVENTION

The disc brake of this invention includes a rotatable disc, a support and a friction pad carried by the support on one side of the disc and having a friction surface movable into contact with the disc. The disc brake actuator includes a pad driving member mounted to the support for movement toward the disc, a shaft rotatably carried by the support, means for rotating the shaft, a cam secured to the shaft and a cam follower rotatably carried by the pad driving member. Rotation of the shaft, the cam and the cam follower moves the pad driving member to force the friction pad into contact with the disc.

The outer or camming surface of the cam is of a continually increasing radial dimension relative to the center of the shaft to drive the cam follower and pad driving member at a continually increasing rate during rotation of the cam and to accommodate wear of the friction lining material.

The present invention provides an efficient rotating cam actuator for a disc brake in which the friction lining pads are moved in a direction normal to the rotor braking surfaces.

The cam actuator of the present invention moves substantially the entire friction lining surface of each pad into contact with a rotor braking surface at the same time and under substantially uniform pressure across the entire surface of the friction pad lining.

These and other advantages provided by the present invention will become apparent from the following description of the embodiment shown by the accompanying drawings.

BRIEF DESCRIPTION OF THE DRAWINGS

In the drawings wherin reference numerals refer to like parts.

DESCRIPTION OF THE INVENTION

Figure 1:
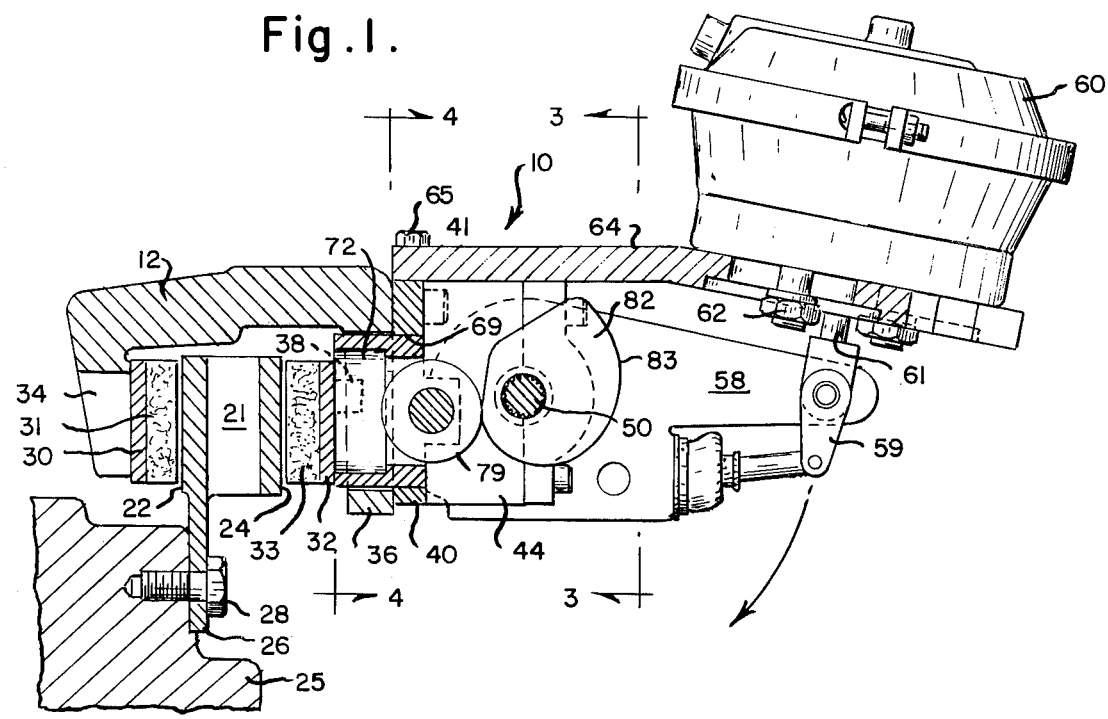
FIG. 1 is a side elevation, partly in section, of a disc brake.
Figure 2:
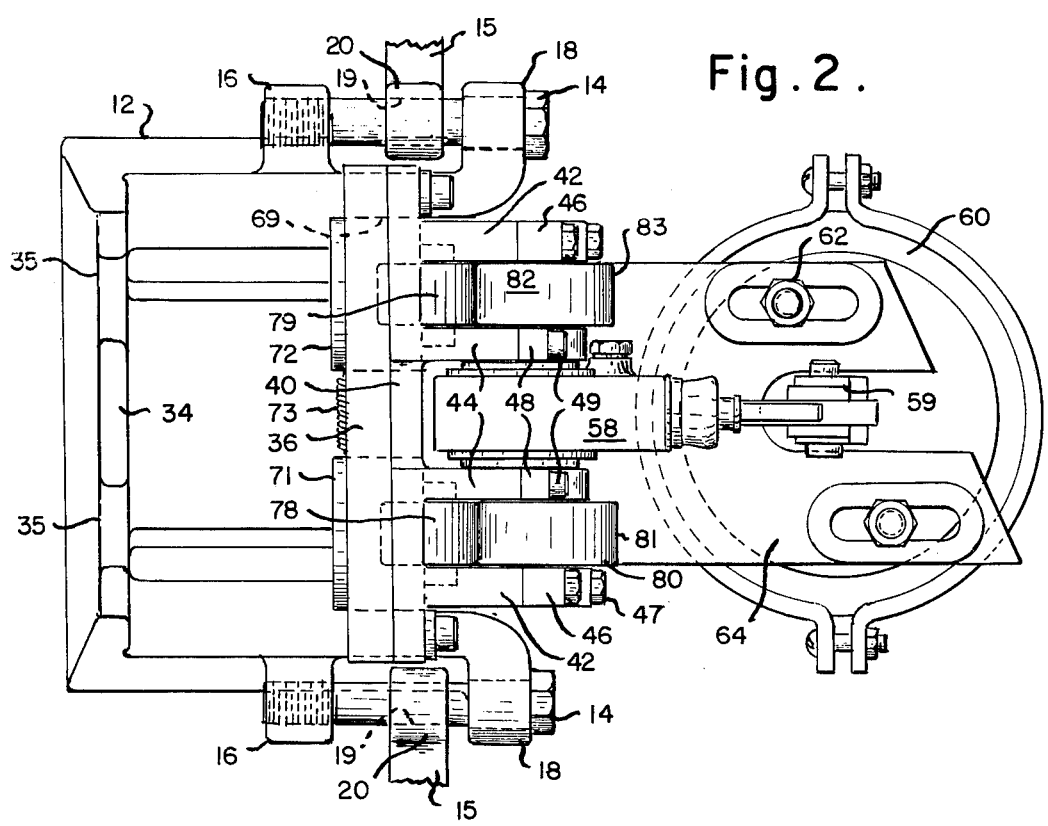
FIG. 2 is a bottom view of the actuator of FIG. 1.
Figure 3:
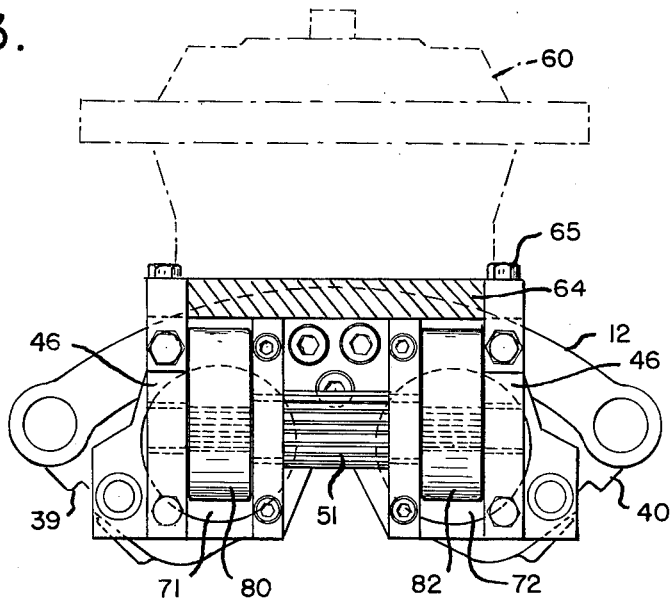
FIG. 3 is a view of the actuator, partly in section, taken along the line 3—3 of FIG. 1.
Figure 4:
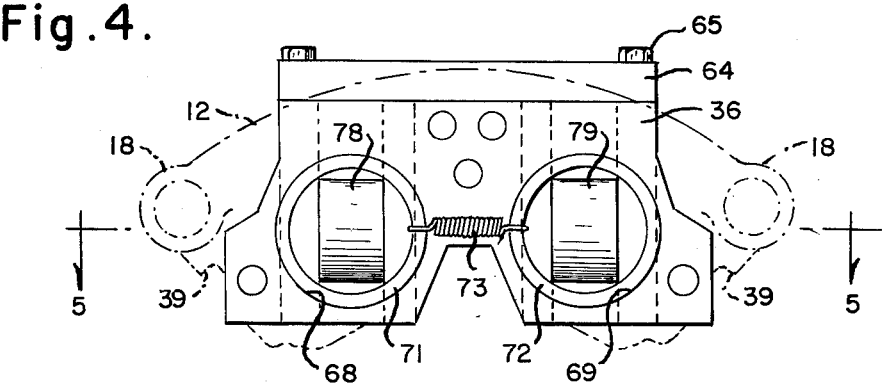
FIG. 4 is a view of the actuator as taken along the line 4—4 of FIG. 1.
Figure 5:
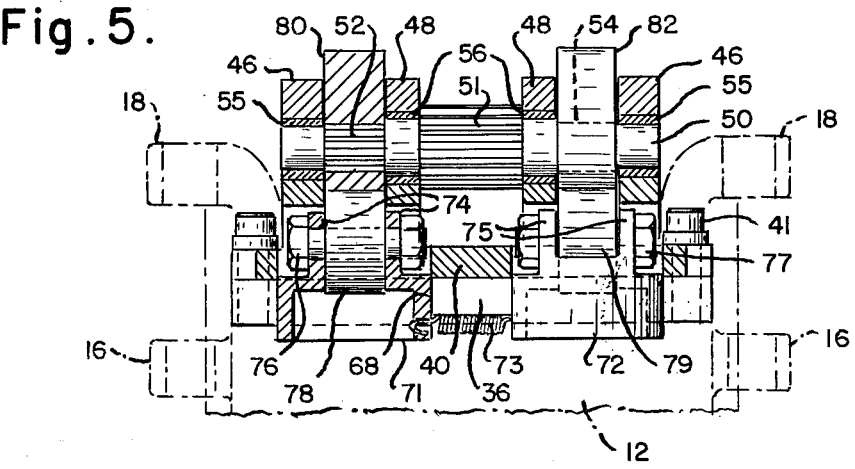
FIG. 5 is a view taken along the line 5—5 of FIG. 4.

With reference to the drawings, FIGS. 1 and 2 in particular, there is shown a disc brake generally designated by the reference numeral 10. The assembly 10 includes a floating caliper 12 which supports most of the remaining elements of the brake. The caliper 12 is mounted for movement relative to a support member or spider 15 as best shown in FIG. 2 by a pair of bolts 14 each of which are respectively tightened between spaced bosses 16, 18 formed integrally with and at opposite ends of the caliper 12. The bolt shanks freely and slidably pass through a pair of bores 19 respectively provided to bosses 20 integrally formed with the support member 15. The support member 15 may be rigidly secured to a vehicle axle housing by welding or other conventional means. A brake disc or rotor 21 having axially-spaced friction braking annular surfaces 22, 24 is secured for rotation with a wheel hub 25 by means of a flange 26 and bolts 28.

A pair of brake pads 30, 32 carrying asbestos or other frictiontype linings 31, 33 are respectively supported by the caliper 12 and member 15 with the linings 31, 33 respectively in close proximity to the oppositely facing friction braking surfaces 22, 24 of the brake disc or rotor 21. The brake pads 30, 32 are supported between the rotor 21 and a pair of legs 34, 36 depending from the central web portion of the caliper 12. The brake pad 30 may be secured by conventional means to the caliper leg 34. One or more openings 35 may be provided to the caliper leg 34 to reduce the mass of the unit. The friction pad 32 is supported within the member 15 for movement relative to the caliper leg 36 and the disc braking surface 24.

A camshaft bearing plate 40 is secured by cap screws 41 to the caliper leg 36. Two pair of bearing blocks 42, 44 are formed integral with and extend outward from the bearing plate 40. Bearing seats in the form of semicylindrical openings are provided in the outer end surface of each bearing block 42, 44. Bearing caps 46 and 48 having oppositely disposed semi-cylindrical bearing seats are respectively secured by bolts 47 and 48 to the outer ends of bearing blocks 42 and 44.

A camshaft 50 having three longitudinally extending, externally splined portions 51, 52 and 54 is journalled in the bearing blocks 42, 44 by sleeve-type bearings 55 and 56. A lever 58 is splined to the center section 51 of camshaft 50 between the bearing blocks 44. The brake actuating lever 58 is preferably a self-adjusting lever of the type disclosed in U.S. Pat. No. 3,949,840 issued on Apr. 13, 1976 and assigned to the assignee of the present invention. The lever 58 is connected by means of a clevis 59 to the piston rod 61 of an air motor 60. The air motor 60 is fixed by stud and nut assemblies 62 to a bracket 64 which in turn is secured by bolts 65 to the cam shaft bearing plate 40.

Caliper leg 36 and bearing plate 40 each include a pair of axially aligned circular apertures which provide spaced bores 68 and 69 through the caliper leg and bearing plate. A pair of pistons 71 and 72 are respectively mounted in cylindrical bores 68 and 69 for sliding movement to drive the friction pad 32 toward the friction braking surface 24 of brake disc or rotor 21. A tension spring 73 secured at its opposite ends to apertures provided through the sidewalls of pistons 71 and 72 prevents the pistons from rotating in the cylindrical bores 68 and 69. A tab 38 extends radially outwardly from each end of brake pad 32. The tabs 38 slide in grooves 39 formed integrally within the support member 15 to prevent the friction pad 32 from moving radially relative to the brake disc 21.

The pistons 71 and 72 are each respectively formed with a spaced pair of rearwardly extending legs 74 and 75. Nut and bolt assemblies 76 and 77 are respectively mounted to bores provided through the legs 74 and 75 of pistons 71 and 72. Roller-type can followers 78 and 79 are respectively mounted for relatively friction-free rotation on the nut and bolt assemblies 76 and 77 between the legs 74 of piston 71 and legs 75 of piston 72.

Cams 80 and 82 are splined at 52 and 54 to the camshaft 50. The outer or cam surfaces 81, 83 of the cam 80, 82 are each formed as a surface of continually increasing radius relative to the center of the camshaft 50 for an arcuate distace of approximately 270°. The cam surfaces 81, 83 approximate an involute curve and serve to move the cam followers 78, 79 at a smooth but constantly increasing rate per degree of revolution of the camshaft. The cam surfaces 81, 83 also accommodate lining wear since the cams will be rotated clockwise approximately one sixth degree for each automatic incremental adjustment of the lever 58 and will move the pistons 71, 72 approximately .001 inches toward the friction braking surface 24 of the brake disc 21. This is achieved by starting with a radius of about 3/4 of an inch at the point where the cam is shown as contacting the cam follower in FIG. 1 and gradually increasing the radius at the rate of about 0.060 inch for every additional 9° arc of revolution.

The operation of the disc brake assembly 10 will now be described. The brake is operated in a conventional manner by supplying air under pressure to the air motor 60. This forces the piston rod 61 downward as viewed in FIG. 1 to pivot the clevis 59 and lever 58 about the axis of camshaft 50. The lever 58 through the splined connection at 51 rotates the camshaft and the cams 80 and 82 which are splined at 52 and 54 to the camshaft 50. The cam surfaces 81 and 83 respectively rotate the roller-type cam followers 78 and 79 and axially move the pad driving members or pistons 71, 72 toward the friction braking surface 24 of the brake disc or rotor 21. As friction contact is effected between the lining 33 and the friction brake surface 24 there is a reaction force which tends to move the pistons, cam followers, cams, the bearing plate 40 and caliper leg 36 in the opposite direction. This reaction force draws the caliper leg 34 toward the brake disc 21 until the lining 31 of friction pad 30 contacts the friction braking surface 22. As long as the brake assembly 10 is actuated the rotor-type cams 80 and 82 are effective to maintain linings 31 and 33 of friction pads 30 and 32 in contact with the friction braking surfaces 22, 24 of the brake disc 21 as just described.

When the brake is released a return spring mounted internally of the air motor 60 will retract the piston rod 61, clevis 59 and lever 58 to the inactive position as shown in FIG. 1. The lever 58 will normally rotate cam 80, 82 out of pressurized contact with the cam followers 78 and 79. The brake disc or rotor 21 will normally be effective to move the friction pads 30 and 32 out of pressurized contact with the braking surfaces 22, 24. In the event the disc brake assembly 10 has been operated a sufficient number of times to cause significant wear to the linings 31 and 33, the lever 58 will return to the position shown in FIG. 1, but an incremental adjustment will be effected to rotate the camshaft 50 and cams 80 and 82 clockwise relative to the lever 58. The automatic adjusting feature is described in the aforementioned patent and operates in conjunction with the previously described camming surfaces of gradually increasing radius to compensate for friction pad lining wear by automatically adjusting the distance between the cam followers 78, 79 and the axis of rotation of the camshaft 50.

The present invention thus provides an efficient rotary-type cam actuator for a disc brake. The relatively friction-free roller type cam followers rotatably mounted to the pad driving pistons serve to translate the rotary motion effected by the cams to linear motion. The pad driving pistons slidably mounted to the caliper leg and bearing plate transmit the motion from the cams to the friction pad. The pistons apply the braking force to the movable friction pad at spaced locations to evenly distribute the force across substantially the entire area of the friction pad. The pistons being slidably mounted to the caliper leg and bearing plate move in a direction substantially normal to the friction braking surface of the brake disc and thereby prevent uneven wear of the lining which might otherwise result if certain portions of the lining were brought into contact with the friction braking surface before other portions of the lining.

The invention may also be embodied in other specific forms without departing from the spirit or essential characteristics thereof. The foregoing description is therefore to be considered as illustrative and not restrictive, the scope of the invention being defined by the appended claims and all changes which come within the meaning and range of equivalency of the claims are therefore intended to be embraced thereby.

I claim:

1. A disc brake comprising a rotatable brake disc, brake support means, a friction pad carried by said support on one side of said disc and having a friction surface movable into contact with one surface of said disc, a pad driving piston slidably carried in an aperture provided to said support for movement toward said disc, a shaft rotatably carried by said support, means for rotating said shaft, a cam non-rotatably secured to said shaft and a cam follower rotatably carried by said piston, whereby rotation of said shaft and cam will move said friction pad surface into contact with said disc.

2. The disc brake defined by claim 1 wherein said cam follower is a roller follower rotatably mounted on a shaft carried by said piston.

3. The disc brake defined by claim 2 wherein said roller follower is driven by a surface of said cam of continually increasing radius.

4. An actuator for a disc brake comprising a caliper including a web and a pair of spaced depending legs, a pair of apertures open through one of said legs, a piston slidably mounted in each of said apertures, roller means rotatably mounted to each of said pistons, a shaft rotatably mounted to said caliper, and a spaced pair of cams mounted for rotation with said shaft, each of said cams including an outer surface of increasing radial dimension aligned with an annular surface of one of said roller means.

5. A disc brake comprising a rotatable brake disc including oppositely disposed friction braking surfaces, a support, a caliper including a web extending across the periphery of said disc and a pair of legs extending radially inward on opposite sides of said disc, one of said legs including a pair of spaced apertures, means slidably mounting said caliper to said support for movement relative to said disc in a direction substantially normal to said friction braking surfaces, a pair of friction pads, each having a friction surface proximate to a braking surface of said disc, one of said friction pads being movable relative to said caliper between said apertured leg and said disc, the other friction pad being movable by the other leg of said caliper into contact with said disc, a piston slidably mounted in each of said apertures for moving said one friction pad, each of said pistons mounting a roller-type cam follower, a shaft rotatably mounted to said caliper, a spaced pair of cams secured for rotation with said shaft, each of said cams having an outer surface of increasing radial dimension aligned with an annular surface of one of said cam followers, and means for rotating said shaft to move said pistons and said caliper relative to said support thereby moving said friction pad surfaces into contact with said friction braking surfaces.

* * * * *